June 13, 1967

L. L. KEPKAY 3,324,860

COMBINE GRAIN SAVER

Filed Aug. 27, 1964

Inventor
LESLIE LYONS KEPKAY
BY
Tweedale & Gerhardt
Attorneys

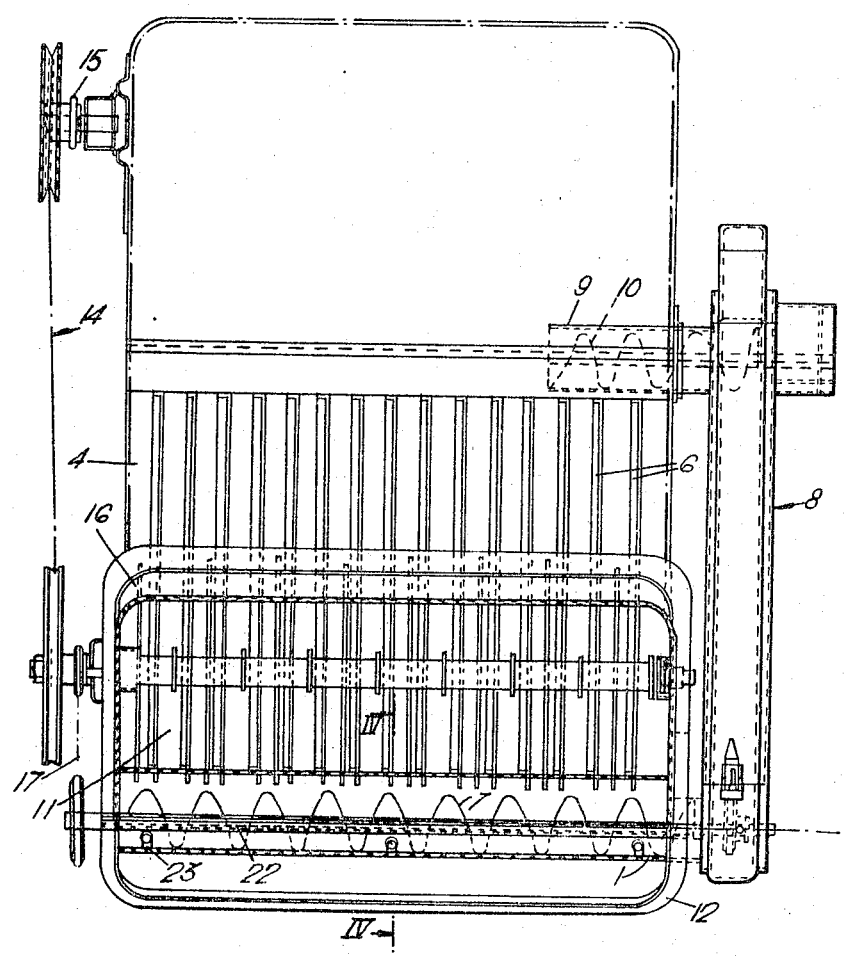

June 13, 1967   L. L. KEPKAY   3,324,860
COMBINE GRAIN SAVER
Filed Aug. 27, 1964   5 Sheets-Sheet 4
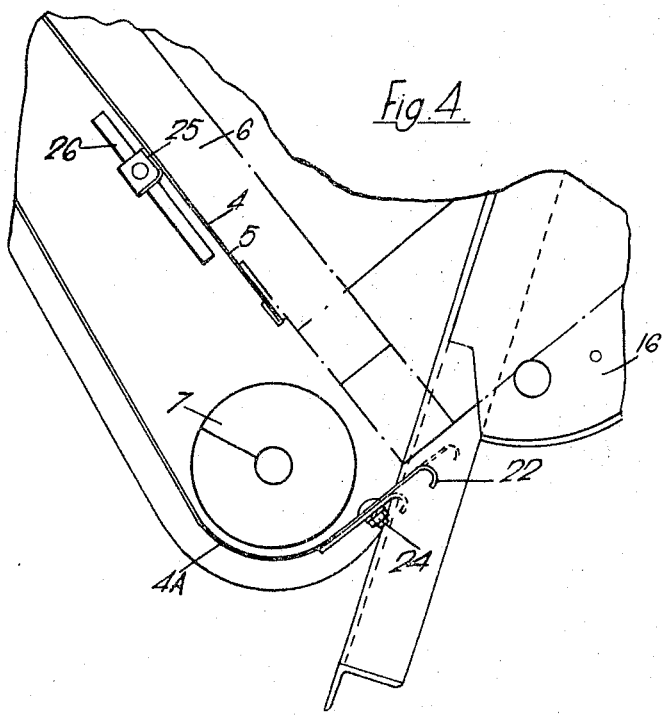
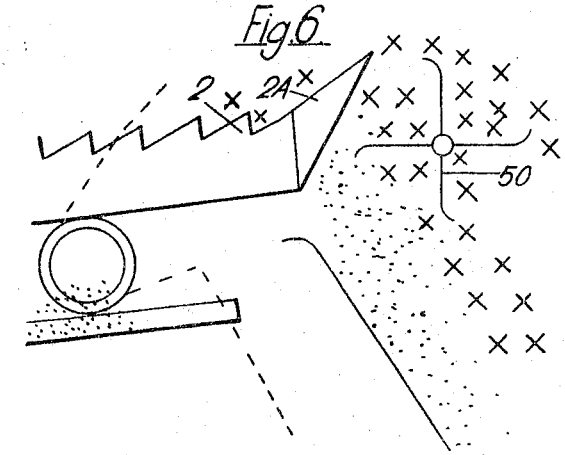
Inventor
LESLIE LYONS KEPKAY
BY Tweedale & Gerhardt
Attorneys

United States Patent Office 3,324,860
Patented June 13, 1967

3,324,860
COMBINE GRAIN SAVER
Leslie Lyons Kepkay, Leamington Spa, England, assignor to Massey-Ferguson Service N.V., Curacao, Netherlands Antilles
Filed Aug. 27, 1964, Ser. No. 392,428
Claims priority, application Great Britain, Sept. 5, 1963, 35,042/63; Dec. 28, 1963, 51,100/63
14 Claims. (Cl. 130—27)

This invention relates to combine harvesters and more particularly apparatus for separating grain and straw in a combine.

In conventional combines, while most of the grain which has not been separated in the concave is separated from the straw on the straw walkers, an appreciable quantity of grain is lost to the grain output of the harvester because it does not pass through the straw walkers but drops off the rear end of the straw walkers on the ground particular under wet conditions.

It is therefore an object of this invention to provide a combine harvester in which the material discharged from the straw walkers is further separated with the grain separated from said material returned to the grain collecting area of the combine.

A further object is to provide a combine harvester having separating apparatus disposed to receive material discharged from the straw walkers which will further separate any grain in the material from the straw and return it to the grain output of the combine and at the same time will discharge the straw from the combine.

According to the present invention a combine harvester is provided which includes apparatus for separating a mixture of grain and straw arranged to receive the mixture as it passes from a previous treatment stage with a horizontal component of velocity. The separating apparatus comprises a downwardly and rearwardly inclined straw separating means extending over grain collecting means whilst preventing straw from passing thereto.

The grain collecting means may be a chute, and a trough at the lower end of a chute onto and down which grain falls into the trough. The straw separating means may comprise a plurality of upstanding fins laterally spaced on the chute and extending longitudinally of the latter and over the trough, and the grain return means may comprise a discharge auger in the trough feeding an elevator.

A rotary beater may be provided adjacent the rear end of the separator for moving straw off the latter. The beater may alternatively act as a straw chopper by appropriately increasing its rotary speed and providing stationary knives to cooperate with it.

The trough may have a lip which momentarily retards movement of the straw so as to assist separation of grain still remaining with the straw.

The beater may have a hood which is replaceable by a straw deflector or diffuser when the beater is used as a chopper.

Other objects, advantages and features of the invention will become apparent from the following description of specific embodiments, by way of example, with reference to the accompanying drawings in which:

FIG. 3 is a front view corresponding to FIG. 2.

FIG. 4 is a detail sectional view to an enlarged scale on the line 4—4 of FIG. 3.

FIG. 6 is a diagrammatic side view of a detail to an enlarged scale and showing a further modification.

Figure 1:
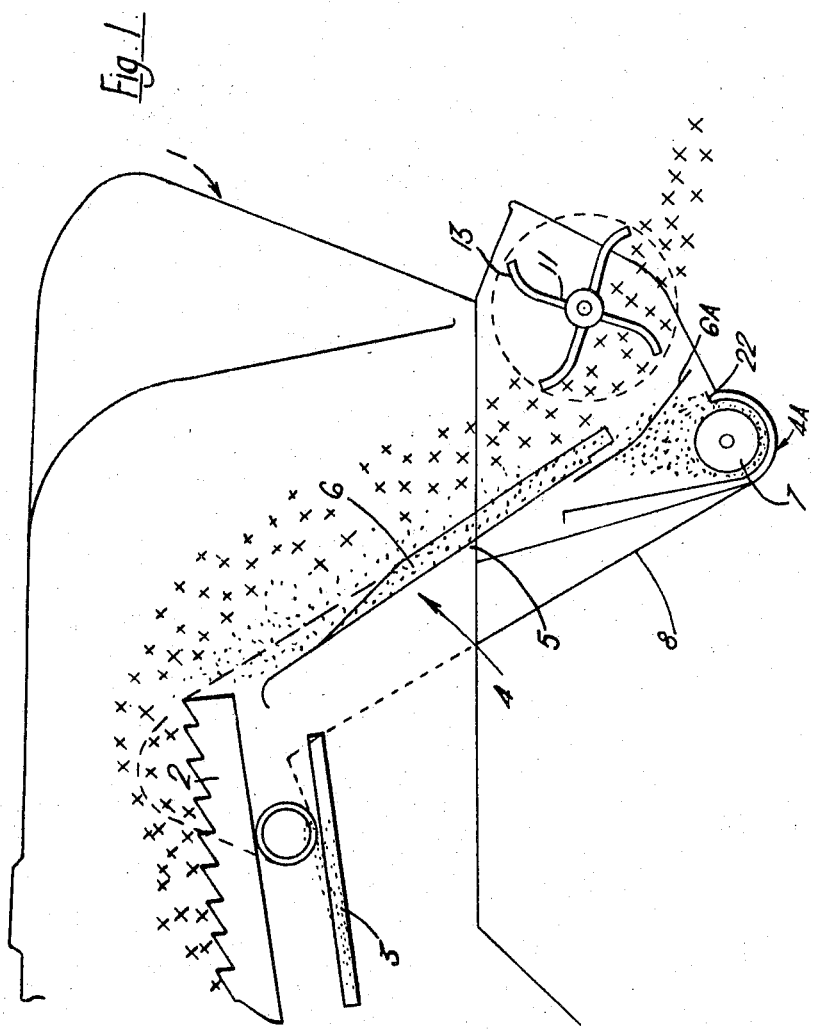
FIG. 1 is a diagrammatic side view of the rear end of a combine harvester having apparatus according to the invention.

In the embodiments of the invention illustrated in the drawings, the apparatus for separating a mixture of grain and straw is employed as a grain saver. That is to say in a combine harvester, grain remaining in the straw after the threshing operation, is separated from straw by passing the straw and grain over what are usually called straw walkers, separated grain passing through the straw walkers for passage to the grain output of the harvester, and straw being discharged from the rear end of the straw walkers to the ground.

The purpose of the grain saver is to collect grain which would otherwise be lost and return it to the operating circuit of the harvester.

Referring to the drawings, a combine harvester generally indicated at 1 has straw walkers 2 for conveying and agitating a mixture of straw and grain which has not already been separated in the concave toward the discharge end of the combine. Grain separated from the straw passes through the straw walkers onto a grain pan 3 under the latter and from the pan 3 to a shaker shoe assembly, not shown, and then to the grain tanks of the harvester.

As aforementioned, the straw and some of the grain passes over the rear end of the straw walkers 2, and, in conventional combines, the entire mixture is usually discharged from the combine onto the ground. According to the present invention, as set forth below, a grain saver is provided for separating and collecting this grain from the mixture as it falls from the straw walkers. The grain saver consists generally of grain collecting means, straw separating means, and means for returning the collected grain to the operating system of the harvester.

The grain collecting means consists of a chute 4 and a trough 4A at the lower end of the chute 4. The chute 4 is in the form of a tray or floor 5 which inclines rearwardly and downwardly from the rear end of the harvester and its upper end is spaced forwardly of the rear end of the straw walkers 2 so that there is a considerable drop between the rear end of the straw walkers 2 and the floor 5.

The straw separating means consists of a plurality of upstanding parallel fins 6 laterally spaced on the floor 5 and extending longitudinally thereof and over the trough 4A, and the means for returning collected grain from the trough 4A includes an auger 7 in the latter.

In use, the mixture of straw and grain is discharged from the straw walkers 2 with a horizontal component of velocity and the grain and straw falls respectively through different paths towards the chute 4 so that they separate from each other during their fall. In general, it may be said that the grain drops sharply immediately it leaves the straw walkers, while the straw which is less dense is discharged further before drops through an arc so that its path is to the rear of the path of the grain. The grain passes between the fins 6 onto the floor 5 and runs down the latter into the trough 4A, while the straw is kept separate from the grain by the fins 6 which prevent the straw from reaching the floor 5. The straw slides down the fins 6 for discharge, and the auger 7 is driven to return grain from the trough 4A to the operating system of the harvester.

The means for returning the grain from the trough 4A also includes an elevator 8 into the lower end of which the auger 7 feeds grain from the trough 4A, a trough 9 at the upper end of the elevator 8 into which the latter discharges the grain, and in the trough 9 an auger 10 which feeds grain from the latter into the grain pin 3. The auger may extend fully across the grain pan 3. Additionally, the arrangement may be such that the auger discharges the grain from several outlets in the trough 9 so that it is evenly distributed across the pan.

For assisting straw to move off the fins 6, a rotary beater 11 is mounted above and adjacent the rear end of the chute 4 on a frame 12. Beater 11 has a series of axially interspaced groups of radial vanes or arms 13 and is driven by a drive belt 14 from a drive sprocket or pulley 15, FIG. 3, so as to rotate in a counter-clockwise direction in FIG. 1. Detachably mounted on the frame 12 is a hood 16 partially enclosing the beater. Auger 7 is driven by the beater through a drive 17.

Beater 11 may alternatively be used as a straw chopper, in which case, upright stationary knives 18 are attached to a carrier 19 which is bolted to the hood 16 and cooperates with the arms 13. Knives 18 are pivotally mounted and are loaded by springs 20 so that the knives 18 may yield rearwardly and downwardly into the carrier 19 under excess load. When the knives 18 are used, a deflector or diffuser member 21 is substituted for the hood 16, and the rotary speed of the beater 11 is appropriately increased, for example, by changing the pulleys or sprockets of the drive thereto.

A lip 22 on the rear of the trough 4A momentarily retards straw on the fins 6 for assisting in the separation of grain still remaining with the straw. Lip 22 is height-adjustable, as seen in FIG. 4, by means of slots 23 engaging over bolts 24 on the trough 4A, and chute 4. Fins 6 are adjustable in the direction of their length relative to the trough 4A, by bolts 25 in slots 26 in the side walls of the harvester housing 1A, to suit varying crop conditions.

Frame 12 has brackets 27 pivotally mounted on the end portion of the trough 4A, so that when bolts 28, which secure frame 12 to housing 1A, are released, frame 12 together with beater 11 and hood 12 may be swung down rearwardly to provide easier access to the various components located thereat.

Auger 7 is drivingly connected to the elevator 8 which in turn drives auger 10 through a drive chain 29 at its upper end.

In a modification shown in FIG. 1, fins 6 stop short of the auger 7 and an open ended wire comb 6A, formed as a continuation of the fins 6, extends over said auger.

Figure 2:
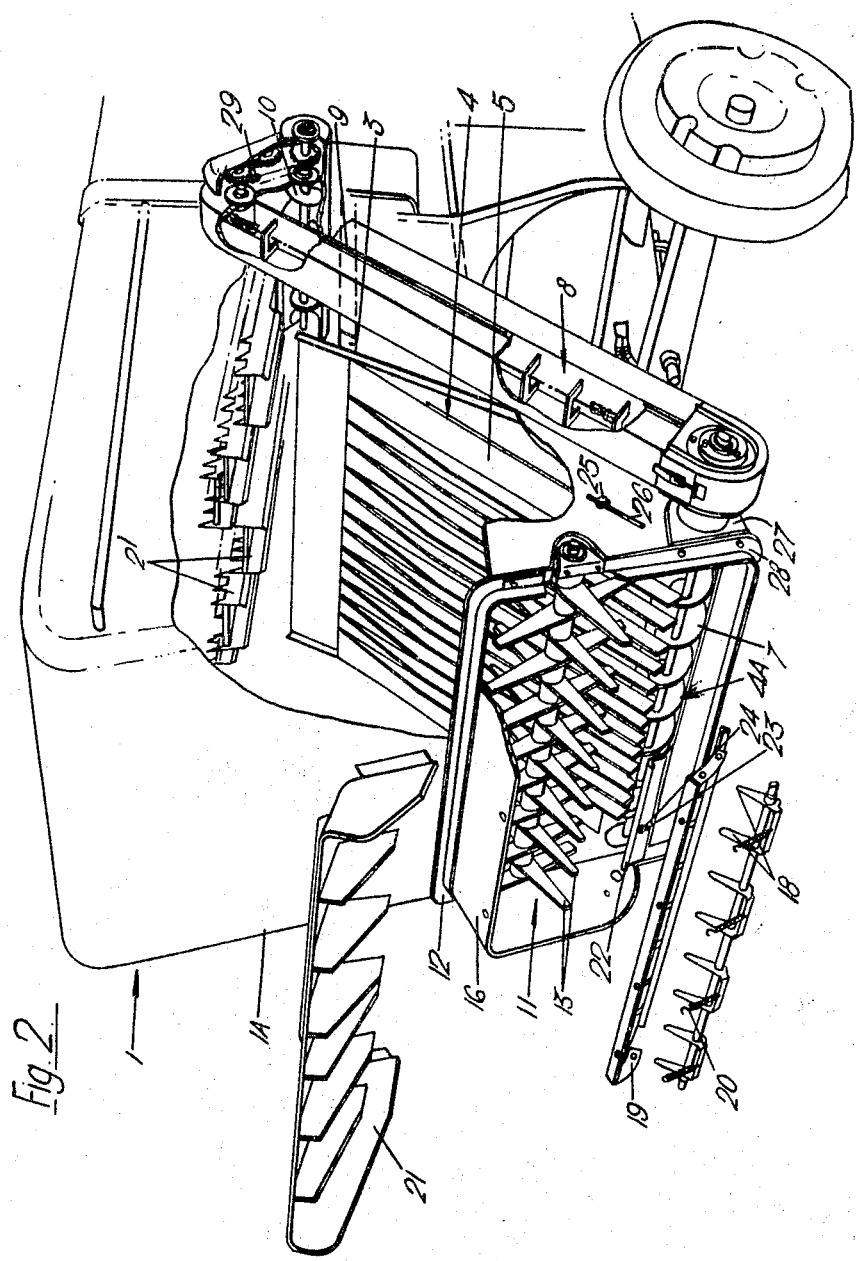
FIG. 2 is a fragmentary, perspective view of the combine harvester illustrated in FIG. 1.
Figure 5:
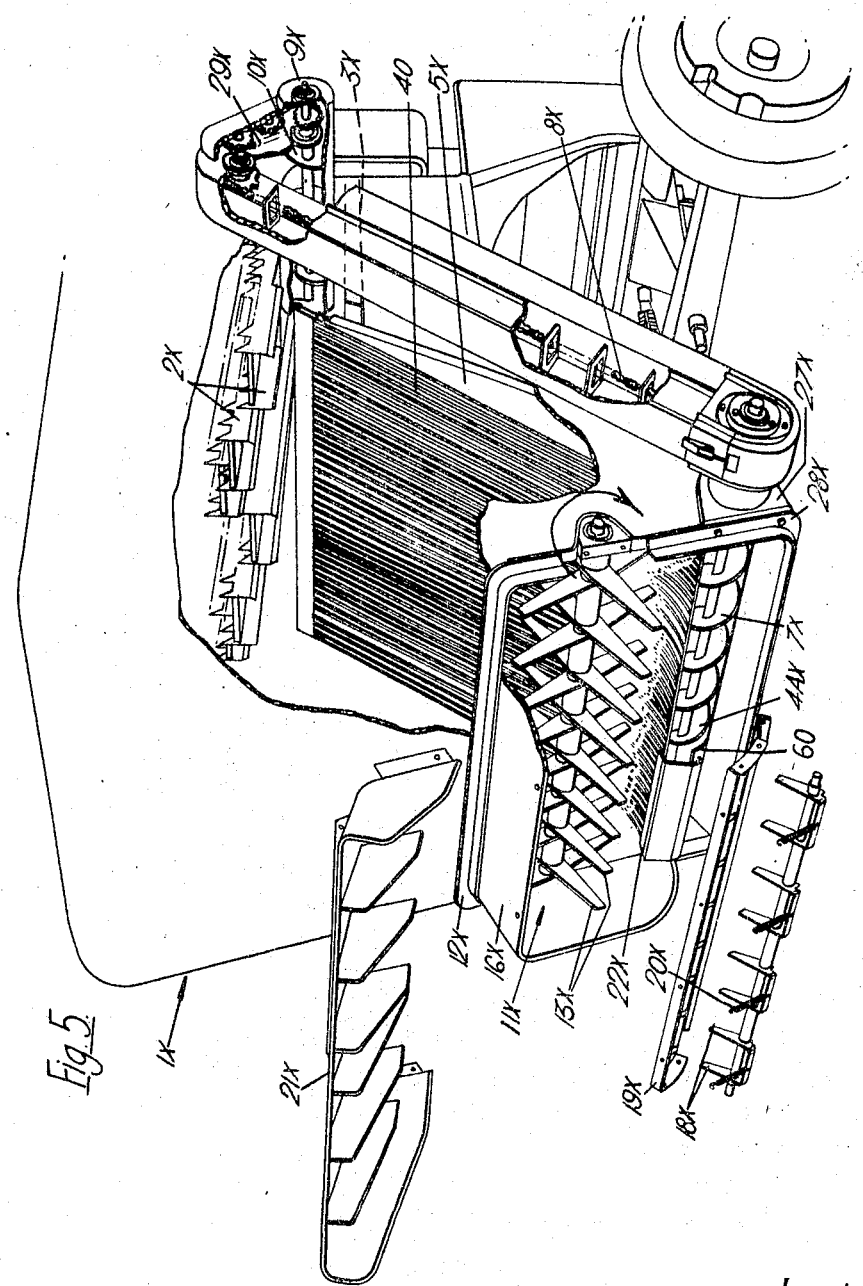
FIG. 5 is a fragmentary perspective view similar to FIG. 2 but showing a modification.

FIG. 5 generally shows the combine harvester of FIG. 2 and parts common to both will be designated by like reference numerals with the addition of the suffix x in FIG. 5. Only modifications will be described. In FIG. 5 the fins and chute are replaced by a fixed grate 40 which extends rearwardly and downwardly from the rear end of the straw walkers 2x and located therebelow. The upper end of grate 40 is spaced forwardly of the rear end of the straw walkers 2x so that there is a substantial drop between the rear end of the straw walkers and grate 40.

In operation, the grain falls through grate 40 onto a downwardly and rearwardly inclined tray 5x located below and in front of the grate 40. The lower end of the tray 5x has an upturned lip 60 which projects slightly above the lower end of grate 40 and forms with the lower end portion of grate 40, the trough 4Ax.

Referring to FIG. 6 a further modification comprises placing an auxiliary flailed rotor 50 at the rear end of the straw walkers 2, and the rear end of the straw walkers are formed with upwardly directed guides 2A.

In operation, the auxiliary rotor 50 is rotated clockwise, as viewed in FIG. 6, and the straw is guided over rotor 50 while the grain passes under the rotor 50. Thus, an initial separation is obtained before the grain and straw pass to the inclined straw separating means.

As an alternative to the rearwardly inclined straw separating means, any of the above described embodiments may be replaced by a substantially horizontal open-work conveyor and tray.

It is understood that although in the above described embodiments the apparatus is used as a grain saver, the straw walkers of the combine harvester may be replaced by the grain and straw separating apparatus of any one of the embodiments.

In addition, there may be two or three such apparatus in series, in which case there would be provided means for transporting the discharge straw from one apparatus and delivering it to the next for further separating and means for conveying the grain from each apparatus to the operating system of the harvester.

I claim:

1. Separating apparatus having an inlet end and a discharge end, stationary straw support and guide means at said discharge end defined with escape passages for grain, said stationary straw support being inclined upwardly toward the inlet end, grain collecting means below the straw support for receiving grain through said escape passages, and means for conveying a mixture of straw and grain toward the discharge end with a horizontal component of velocity, said conveying means having its delivery disposed above the upper end of the straw support and guide means such that as the mixture leaves the delivery end of the conveying means with said horizontal component of velocity, the heavier grain will fall onto the stationary straw support and guide means ahead of the straw and pass through the escape passages to the grain collecting means, and the straw will fall onto the guide means and pass out of the discharge end of the separating apparatus.

2. The construction claimed in claim 1 wherein said straw support and guide means comprises a plurality of spaced, parallel, upstanding fins.

3. The construction of claim 1 wherein said grain collecting means comprises an inclined chute disposed beneath said separating means, and a trough at the lower end of said chute for receiving grain from said chute.

4. The construction of claim 3 further including a vaned rotor disposed transversely across the lower end of said separating means for discharging straw from said separating means.

5. The construction of claim 4 further including a series of knives extending across the lower end of the separating means in cooperative relationship with said vaned rotor for chopping straw as it is discharged from said separating means.

6. The construction defined in claim 1 further including grain transporting means for conveying grain from said grain collecting means for further treatment.

7. The construction of claim 6 wherein said grain transporting means includes a first auger for discharging grain from said trough, an elevator having its inlet end disposed to receive grain from said first auger, and a second auger for conveying grain from the discharge end of the elevator.

8. The construction of claim 1 wherein said conveying means comprises straw walkers.

9. The construction of claim 8 including a vaned rotor positioned adjacent the rear end of the straw walkers to assist in the separation of the mixture as it falls to the separating apparatus.

10. The construction of claim 8 in which the trough is provided with a lip for momentarily retarding movement of the straw to assist separation of grain still remaining with the straw.

11. The construction of claim 8 including a beater located adjacent the rear end of the straw separating means for discharging the straw from the separating means.

12. The construction of claim 11, further including stationary knives cooperating with the beater to chop the straw as it is discharged from the separating knives.

13. The construction of claim 12 including a straw deflector cooperatively associated with the beater.

14. A combine harvester including straw walkers having material receiving and delivery ends for agitating and conveying a partially separated mixture of grain and straw toward the rear end of the combine and discharging the mixture from the delivery end of the straw walkers and a horizontal component of velocity, a plurality of upwardly and forwardly inclined, spaced, parallel fins having their lower ends supported at the discharge end of the combine and their upper ends disposed beneath the delivery end of the straw walkers, and grain collecting means below the fins for receiving grain passing through the space between the fins, said straw walkers discharging the mixture from its delivery end to cause the heavier grain in the mixture to fall through the space between the fins ahead of the lighter straw and pass to the grain collecting means and the straw to be guided to the discharge end of the combine by said fins.

References Cited
UNITED STATES PATENTS

| | | | |
|---|---|---|---|
| 1,181,360 | 5/1916 | Walsh | 209—352 |
| 2,213,906 | 9/1940 | Eberson | 146—17 |
| 3,186,460 | 6/1965 | Frederick | 146—117 |

ARMSTRONG G. STONE, *Primary Examiner.*

ANTONIO F. GUIDA, *Examiner.*